United States Patent
Liebig et al.

(10) Patent No.: US 6,519,927 B2
(45) Date of Patent: Feb. 18, 2003

(54) METHOD FOR OPERATING A COMBINED CYCLE POWER PLANT, AND COMBINED CYCLE POWER PLANT

(75) Inventors: Erhard Liebig, Laufenburg (DE); Jean-Pierre Rickli, Uster (CH)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/849,982

(22) Filed: May 8, 2001

(65) Prior Publication Data

US 2001/0049931 A1 Dec. 13, 2001

(30) Foreign Application Priority Data

May 8, 2000 (DE) .......................... 100 22 243

(51) Int. Cl.[7] ................................. F02C 6/18
(52) U.S. Cl. ................................... 60/39.182
(58) Field of Search .................. 60/772, 39.182

(56) References Cited

U.S. PATENT DOCUMENTS

| | | | |
|---|---|---|---|
| 4,896,499 A | * | 1/1990 | Rice ........................ 60/39.182 |
| 5,042,246 A | | 8/1991 | Moore et al. |
| 5,203,160 A | | 4/1993 | Ozono |
| 5,471,832 A | * | 12/1995 | Sugita et al. ............ 60/39.182 |
| 5,473,898 A | | 12/1995 | Briesch |
| 5,778,657 A | * | 7/1998 | Ohtomo et al. .......... 60/39.182 |

FOREIGN PATENT DOCUMENTS

EP  0 415 300 B1  3/1991

* cited by examiner

*Primary Examiner*—Ehud Gartenberg
(74) *Attorney, Agent, or Firm*—Burns, Doane, Swecker & Mathis, L.L.P.

(57) ABSTRACT

In a method for operating a combined cycle power plant (15) with at least two power plant units (16A, . . . , 16D), each of which includes a water/steam cycle, an accelerated start-up is achieved in a simple manner by removing a heat-transporting fluid from another operating power plant unit and using it for the preheating and/or maintaining of the heat of individual components of the water/steam cycle in one of the power plant units (16A, . . . , 16D).

5 Claims, 4 Drawing Sheets

METHOD FOR OPERATING A COMBINED CYCLE POWER PLANT, AND COMBINED CYCLE POWER PLANT

BACKGROUND OF THE INVENTION

The invention at hand relates to the field of power plant technology. It relates to a method for operating a combined cycle power plant having at least two power plant units, each of which power plant units includes a water/steam cycle, as well as to a combined cycle power plant useful for executing the method.

When starting or cold-starting a combined cycle power plant, in which combined cycle power plant the hot waste gases of a gas turbine system are used in order to generate steam within a water/steam cycle in a heat recovery steam generator and work it off via a steam turbine, the heat recovery steam generator, because of its unstable or uncontrollable behavior in the start-up phase up to about 10 (to 20) bar, as well as the thick-walled components of the water/steam cycle (boiler cylinders, steam lines, steam turbines, . . . ) must be considered, with respect to the developing thermal stresses, as critical components that determine the start-up time. The thick-walled containers and components are especially sensitive with respect to large temperature gradients. However, because of the material properties of water or steam, such temperature gradients are created during the start-up or pressure build-up in the system; and this occurs especially in a phase where the system must be left more or less in its natural progression. Only starting at a pressure of about 10 to 20 bar is it practical to intervene by control-technological means. The saturation temperature hereby occurs already at about 180 to 210° C. A preheating (during the cold start) or maintaining of the heat (during re-start) is able to keep the stresses at a low level and substantially reduce start-up times in such cases.

U.S. Pat. No. 5,473,898 suggests that for a combined cycle power plant, compressed, heated air from the compressor of the associated gas turbine system is branched off and used to preheat the steam turbine of the water/steam cycle. The disadvantage hereby is that on the one hand the gas turbine system already must have been started up for preheating, and that on the other hand another medium (fluid) is used as a working medium for preheating.

U.S. Pat. No. 5,042,246 suggests an auxiliary steam generator for preheating the steam turbine. However, such a separate auxiliary steam generator requires significant additional equipment expenditure.

In U.S. Pat. No. 5,203,160, steam is removed from an auxiliary steam system in order to preheat the steam turbine of a combined cycle power plant. However, no information is provided regarding the generation of the auxiliary steam.

EP-B1-0 415 300 finally suggests that for a pure steam power plant with several power plant units, a mutual auxiliary steam track is used from which the start-up steam for the individual points at which it is needed can be removed. The start-up steam for the auxiliary steam track is hereby generated in a heat recovery steam generator that is supplied with the hot waste gases of a separate start-up gas turbine. The greatly simplified system schematic of such a system is shown in FIG. 1. The steam power plant 10 comprises several power plant units 12A, . . . , 12D, each of which is connected via valves 14 to a common auxiliary steam track 13. The start-up steam for the auxiliary steam track 13 is generated in a separate start-up steam generator 11 that is connected to the auxiliary steam track 13. If start-up steam is required in one of the power plant units 12A, . . . , 12D, the corresponding valve 14 is opened, and the steam is removed from the auxiliary steam track 13.

SUMMARY OF INVENTION

It is the objective of the invention to describe a method for operating a combined cycle power plant that comprises several power plant units and in a simple way enables a preheating or maintaining of heat in a power plant unit with little additional expenditure, as well as a combined cycle power plant for executing the method.

The objective is realized according to the present invention. The core of the invention includes connecting the individual power plant units with a continuous-feeder manifold line and removing a heat-transporting fluid, in particular saturated steam, from one or more of the operated power plant units and using it for preheating or maintaining the heat of another power plant unit.

A preferred embodiment of the method according to the invention includes using saturated steam as the heat-transporting fluid since it is especially suitable for the components of the water/steam cycle that are being supplied with steam.

A preferred embodiment of the combined cycle power plant according to the invention is characterized in that saturated steam is used as a heat-transporting fluid, and that the continuous-feeder manifold line is connected by one each saturated steam line with one or more power plant units for saturated steam removal.

In particular, if the power plant units each comprise a gas turbine system with a cooling air cooler, the continuous-feeder manifold line can be connected via a saturated steam line to the cooling air cooler.

However, if the power plant units each comprise a heat recovery steam generator with a steam drum, the continuous-feeder manifold line also can be connected via a saturated steam line to the steam cylinder.

Finally, if the power plant units each comprise a heat recovery steam generator with a separator, the continuous-feeder manifold line can be connected via a saturated steam line to the separator.

BRIEF DESCRIPTION OF THE DRAWINGS

The invention shall be described below with the help of exemplary embodiments in reference to the drawing.

DESCRIPTION OF THE PREFERRED EMBODIMENTS

Figure 1:
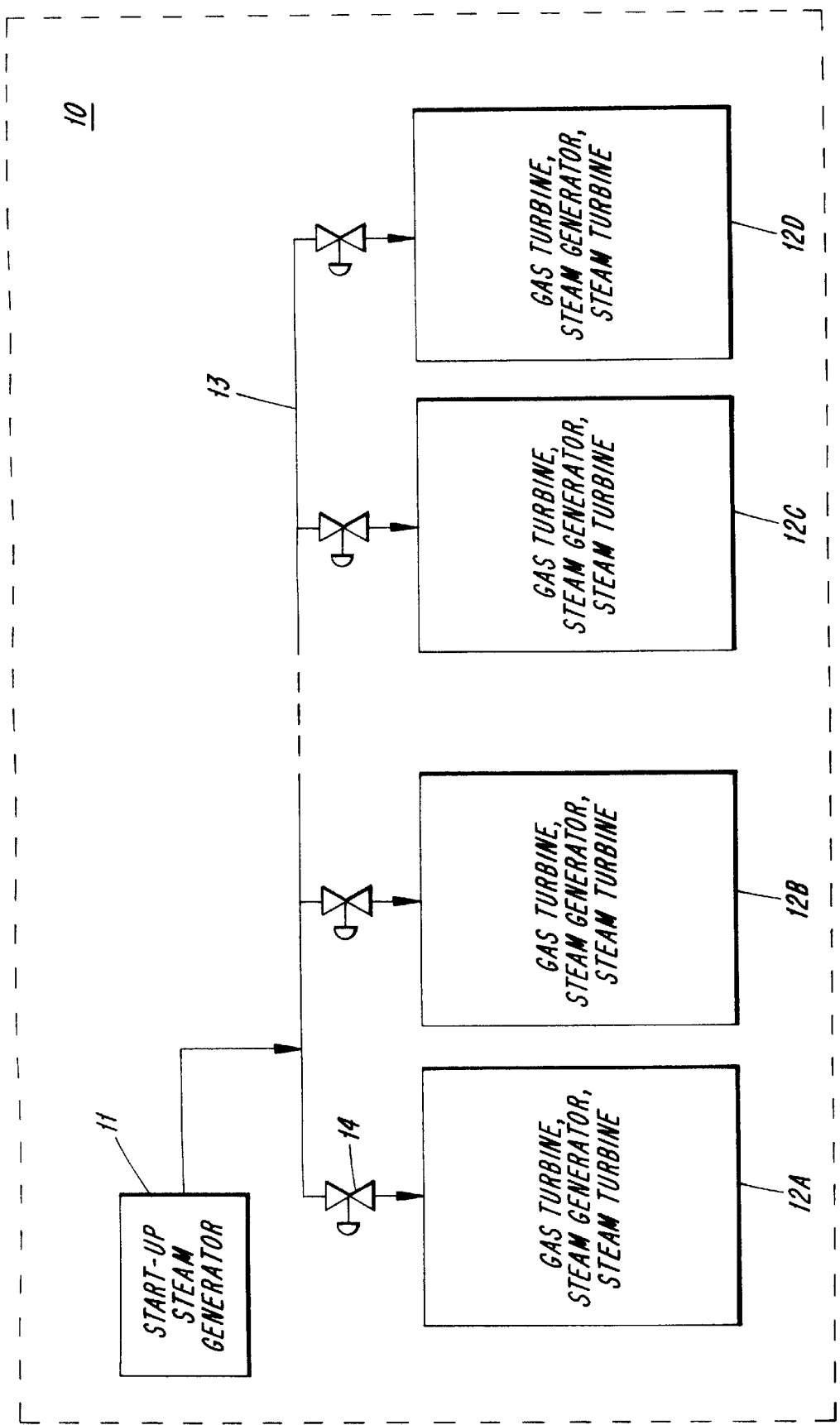
FIG. 1 shows the system schematic of a steam power plant that comprises several power plant units with a common auxiliary steam track and a separate start-up steam generator according to the state of the art.
Figure 2:
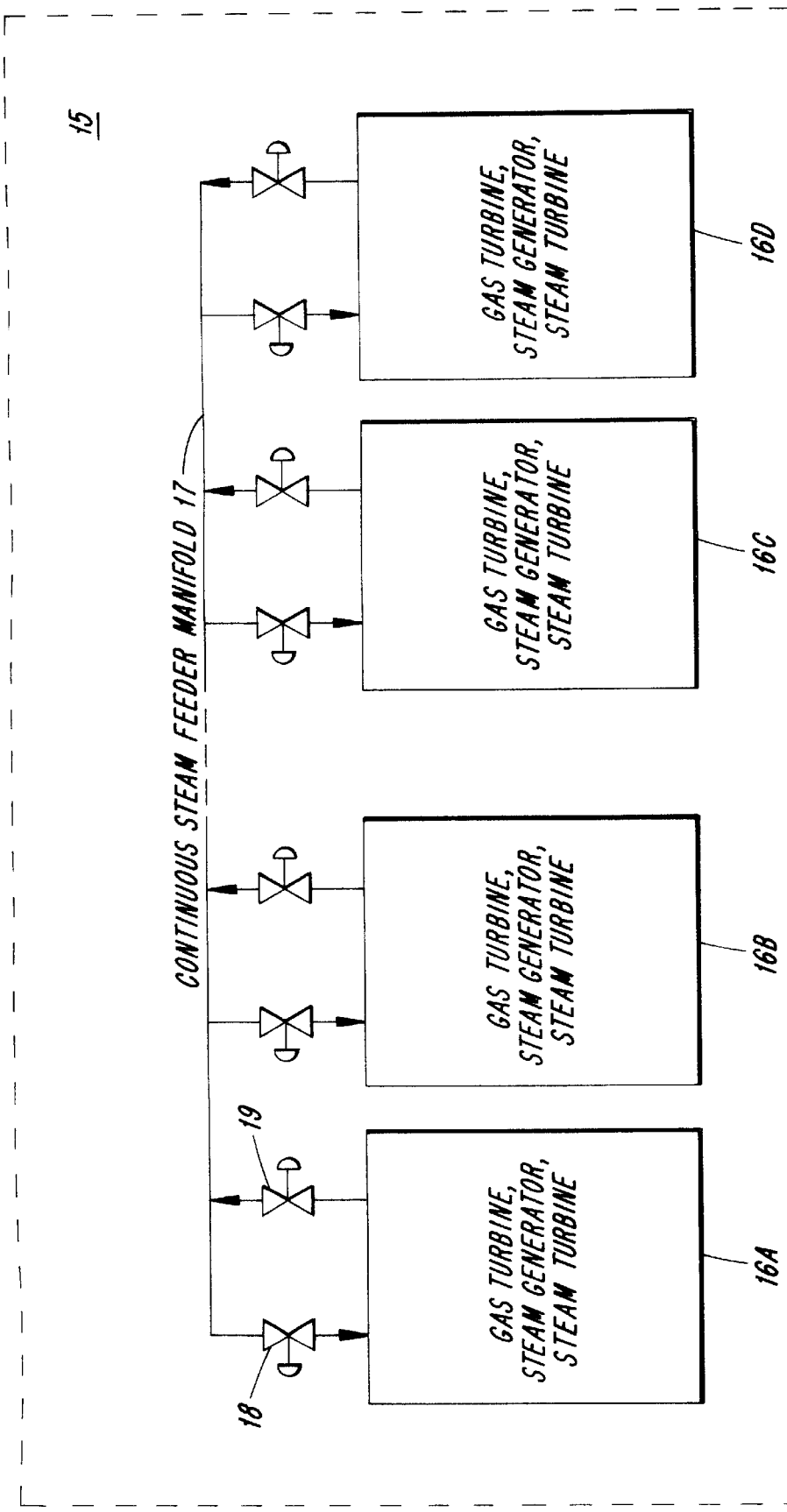
FIG. 2 shows the system schematic of a combined cycle power plant that comprises several power plant units with a common continuous-feeder manifold line for distributing preheating or heat maintaining fluid according to a preferred exemplary embodiment of the invention.

FIG. 2 shows the greatly simplified system schematic of a combined cycle power plant 15 comprising several power plant units 16A, ..., 16D with a common continuous-feeder manifold line 17 for distributing preheating and heat-maintaining fluid according to a preferred exemplary embodiment of the invention. All power plant units 16A, ..., 16D, each of which comprises a gas turbine system and a water/steam cycle with a heat recovery steam generator and a steam turbine, are connected via first locking fittings 18, e.g., valves, to a continuous-feeder manifold line 17. If the critical components from the water/steam cycle of a power plant unit should be preheated for a cold start or its heat should be maintained for a restart, the corresponding first locking fitting 18 is opened, and the heat-transferring fluid, in particular in the form of saturated steam, is removed from the continuous-feeder manifold line 17. The removed fluid is brought and fed within the power plant unit by means of suitable switching measures to the points intended for this purpose in order to bring the corresponding components to the desired temperature or maintain them at this temperature.

No special generation device has been provided for the fluid in the continuous-feeder manifold line 17. Rather, the continuous-feeder manifold line 17 is connected via second locking fittings 19 to one, several, or all power plant units and receives the fluid with the desired temperature optionally from one or several of these power plant units which are operating at this time. This makes it possible to forego a separate device for providing the fluid.

The fluid for the continuous-feeder manifold line 17 principally also can be saturated water that is used especially for maintaining the heat of boiler cylinders, separators, etc. However, the high weight in the lines as well as the danger of splashing of the water inside the lines and in the steam turbine is a disadvantage hereby. For this reason it is preferred that saturated steam, which principally can be fed into the continuous-feeder manifold line 17 through any pressure container that contains saturated water and is able to supply steam into the system for a brief time or continuously, is used as a fluid.

The advantage of using a fluid of the same substance, i.e., water or steam, for mutual preheating and maintaining the heat of components of the water/steam cycles of mutually arranged power plant units is obvious. Principally, hot water, saturated water, saturated steam and hot steam can be used for this. For the temperatures to be achieved for preheating and maintaining the heat, the saturation temperature at the given pressure is the determining factor if steam is used. The use of saturated steam that can be removed additionally in a simple manner, for example from the heat recovery steam generators, is advantageous so that the components belonging to the continuous-feeder manifold line 17 do not have to be designed for higher temperature levels.

The term saturated steam used here in reference to the parameters in the steam cylinders 36 (FIG. 3), separators 39 (FIG. 4), and the continuous-feeder manifold line 17, refers to steam states in the range from a low humidity of about 10% and up to superheating of about 50 K for a given pressure. This depends, on the one hand, on the type of operation of the heat recovery steam generator 34 (FIG. 3 and 4) and the continuous-feeder manifold line 17. On the other hand, humidity may form because of the heat losses, while the steam is overheated by throttling processes.

Figure 3:
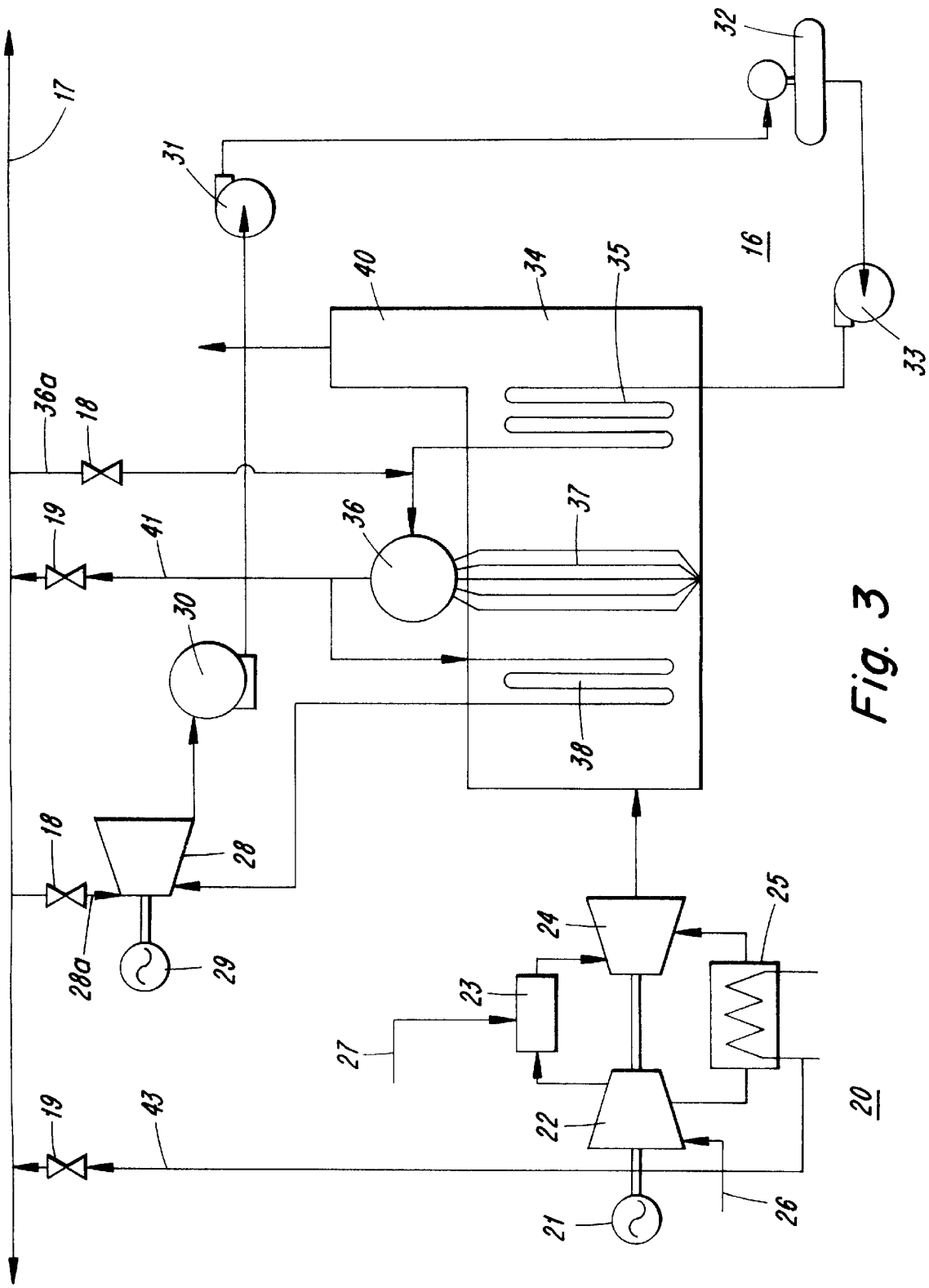
FIG. 3 shows an example of the internal construction of one of the power plant units from FIG. 2 with a heat recovery steam generator with recirculating evaporator with various connection possibilities for feeding saturated steam into the continuous-feeder manifold line; and, FIG. 4 shows an example for the internal construction of one of the power plant units from FIG. 2 with a heat recovery steam generator with once-through evaporator with various connection possibilities for feeding saturated steam into the continuous-feeder manifold line.

The saturated steam can be removed in one of the power plant units in different ways, as shown in FIG. 3. FIG. 3 shows an example of the internal construction of one of the power plant units from FIG. 2 with different connection possibilities for feeding saturated steam into the continuous-feeder manifold line. The power plant unit 16 includes a gas turbine system 20 and a water/steam cycle with a heat recovery steam generator 34 and a steam turbine 28. The gas turbine system 20 includes a compressor 22, a combustor 23, and a gas turbine 24. The compressor 22 and gas turbine 24 are located on a common shaft and drive a first generator 21. The compressor 22 draws in air via an air inlet 26 and compresses the air. The compressed air is used in the combustor 23 for burning a liquid or gaseous fuel supplied via a fuel supply line 27. The hot waste gases that are generated are relaxed in the gas turbine 24 and enter the heat recovery steam generator 34 where they are used for steam generation while giving off heat. The cooled-off waste gases finally leave the heat recovery steam generator 34 via a waste gas chimney 40.

At the same time, part of the compressed air is removed from the compressor 22 at a certain pressure level, is cooled in a cooling air cooler 25, and is then used for cooling the gas turbine 24. One possibility of feeding the continuous-feeder manifold line 17 with saturated steam now consists of branching off part of the steam generated in the cooling air cooler 25 and feeding it via a saturated steam line 43 into the continuous-feeder manifold line 17.

Other possibilities of removing saturated steam relate to the water/steam cycle. In the water/steam cycle, feed water from a feed water container/degasser 32 is first pumped by a feed water pump 33 through an economizer 35 where it is preheated. The preheated water then flows into an evaporator 37 that is connected with a steam cylinder 36 and is evaporated there.

The generated steam is then superheated in a superheater 38 and is relaxed in the steam turbine 28 (in this case one-stage one). The steam turbine 28 drives a second generator 29. After flowing through the steam turbine 28, the steam is evaporated in a condenser 30, and the condensate is pumped back into the feed water container/degasser 32 via a condensate pump 31, which closes the cycle.

Figure 4:
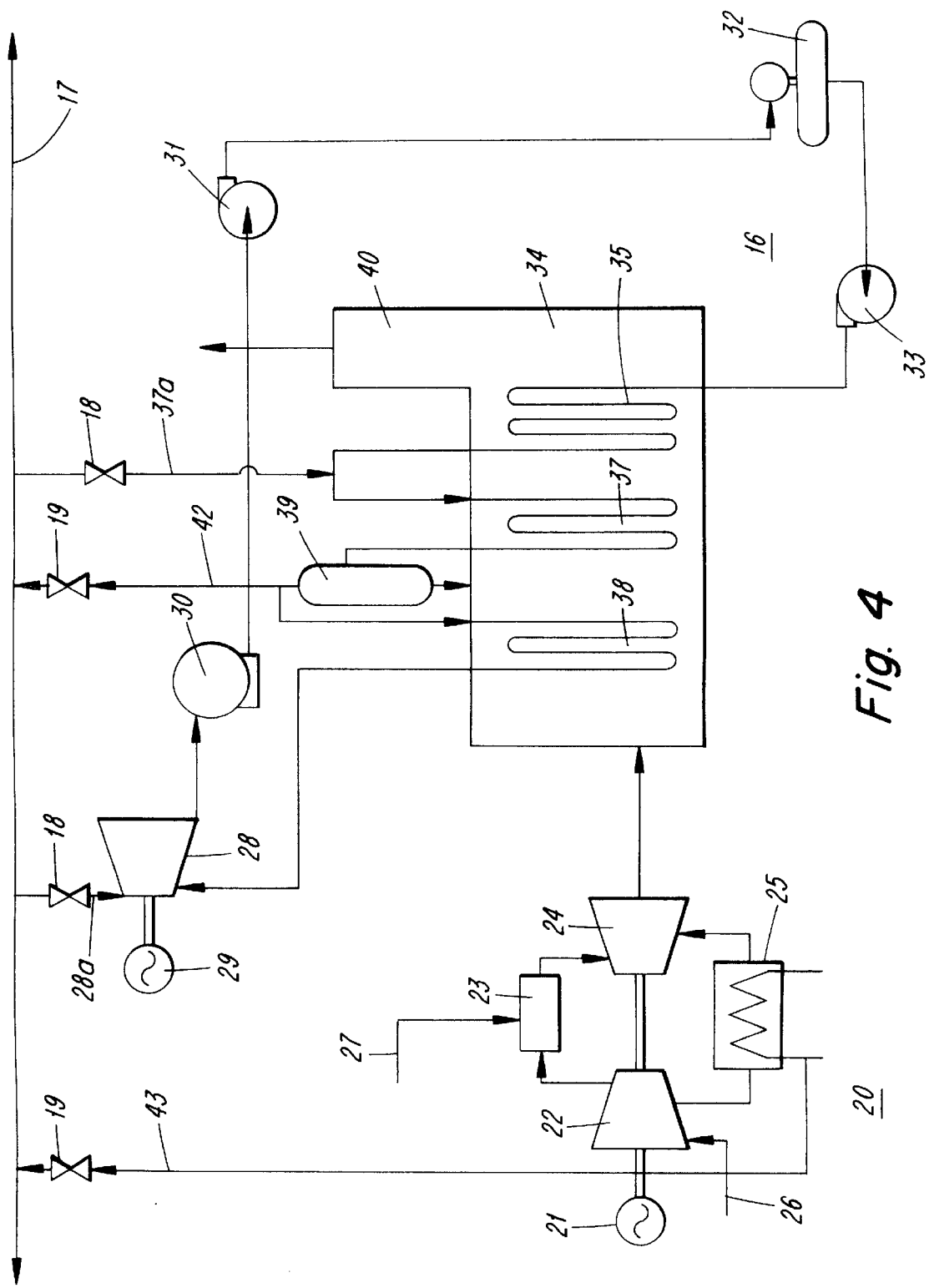

In comparison to FIG. 3 with a heat recovery steam generator 34 based on a cylinder recirculating evaporator, FIG. 4 shows a heat recovery steam generator 34 based on a once-through evaporator. Identical systems or components have been marked with the same reference numbers. The difference consists in the preheating (economizer 35) and evaporation (evaporator 37) of the feed water fed to the heat recovery steam generator 34 in a single cycle. A separator 39 is located between the evaporator 37 and the superheater 38.

It is now especially advantageous to remove saturated steam for the continuous-feeder manifold line 17 from the separator 39 (saturated gas line 42 in FIG. 4) or from the steam cylinder 36 (saturated steam line 41 in FIG. 3). It would also be conceivable to connect an auxiliary boiler that provides the necessary preheating fluid—when none of the power plant units is being operated—to the continuous-feeder manifold line 17.

Heat recovery steam generators 34 are provided on the water steam side with up to three pressure stages in order to utilize the waste gas heat of the gas turbine 24 efficiently. This creates the possibility of working with one or more continuous-feeder manifold lines 17 at different pressure or temperature levels.

The steam turbine 28 has the character of a steam consumer used here as an example. Further potential steam consumers are technological processes with and without use of the steam as a material.

Overall, the invention provides a method or system in which the preheating or maintaining of the heat of the components that are critical for a cold start or restart clearly reduce the start-up time of combined cycle power plants or in which stopping points of the gas turbine during the start-up are no longer necessary. Because of this, a special bypass chimney for the gas turbine is no longer necessary.

What is claimed is:

1. A multi-unit power plant comprising:
   at least two power plant units, each of said at least two power plant units comprising:
      a generator-driving gas turbine; and
      a water steam cycle, the water steam cycle comprising:
         a generator-driving steam turbine; and
         a heat recovery steam generator, the heat recovery steam generator producing steam by heat exchange with hot exhaust gases from the generator-driving gas turbine, each heat recovery steam generator of the at least two power plant units having a saturated steam extraction point;
   a common feeder manifold, the common feeder manifold being common to a multitude of power plant units, the common feeder manifold coupling each water-steam cycle of the at least two power plant units with at least one first steam line, the at least one first steam line having a first shut-off device, the at least one first steam line extracting steam from the common feeder manifold, the common feeder manifold coupling with a saturated steam extraction point of each heat recovery steam generator of the at least two power plant units with at least one second shut-off device, wherein the at least one second shut-off device supplies steam to the common feeder manifold.

2. The multi-unit power plant as recited in claim 1, wherein the saturated steam extraction point is located in a steam drum.

3. The multi-unit power plant as recited in claim 1, wherein the saturated steam extraction point is located in a separator.

4. The multi-unit power plant as recited in claim 1, the gas turbine further comprising:
   an air cooler, the air cooler cooling compressor air of the generator-driving gas turbine in heat exchange with water, thereby producing steam wherein a steam exit port of the air cooler couples with the common feeder manifold.

5. A multi-unit power plant comprising:
   at least two power plant units, each of said at least two power plant units comprising:
      a generator-driving gas turbine; and
      a water steam cycle, the water steam cycle comprising:
         a generator-driving steam turbine; and
         a heat recovery steam generator, the heat recovery steam generator producing steam by heat exchange with hot exhaust gases from the generator-driving gas turbine, each heat recovery steam generator of the at least two power plant units having a saturated steam extraction point;
   a common feeder manifold, the common feeder manifold being common to a multitude of power plant units, the common feeder manifold coupling each water-steam cycle of the at least two power plant units with at least one first steam line, the at least one first steam line having a first shut-off device, the at least one first steam line extracting steam from a steam drum coupled with the common feeder manifold, the common feeder manifold coupling with a saturated steam extraction point of each heat recovery steam generator of the at least two power plant units with at least one second shut-off device wherein the at least one second shut-off device supplies steam to the common feeder manifold.

* * * * *